(12) United States Patent
Schlanger et al.

(10) Patent No.: US 7,965,773 B1
(45) Date of Patent: Jun. 21, 2011

(54) MACROBLOCK CACHE

(75) Inventors: Erik Schlanger, Austin, TX (US);
Nathan Sheeley, Austin, TX (US); Eric Swartzendruber, Round Rock, TX (US); Bill Kwan, Austin, TX (US); Chin-Chia Kuo, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1754 days.

(21) Appl. No.: 11/172,516

(22) Filed: Jun. 30, 2005

(51) Int. Cl.
*H04N 7/12* (2006.01)
*G06K 9/36* (2006.01)

(52) U.S. Cl. .................................. 375/240.16; 382/243

(58) Field of Classification Search .................. 348/402, 348/398, 409, 415, 416, 417, 418, 422, 414; 382/253, 236, 166, 260, 261, 264, 269, 238, 382/239, 243; 375/240, 240.12, 240.16, 375/240.18, 240.24, 240.25, 240.01, 240.08
See application file for complete search history.

(56) References Cited

U.S. PATENT DOCUMENTS

| | | | |
|---|---|---|---|
| 4,631,750 A | 12/1986 | Gabriel et al. | |
| 4,930,013 A * | 5/1990 | Leaning | 348/422.1 |
| 5,097,518 A | 3/1992 | Scott et al. | |
| 5,251,030 A * | 10/1993 | Tanaka | 375/240.16 |
| 5,546,479 A | 8/1996 | Kawanaka et al. | |
| 5,699,121 A * | 12/1997 | Zakhor et al. | 375/240.17 |
| 5,872,866 A | 2/1999 | Strongin et al. | |
| 5,903,313 A | 5/1999 | Tucker et al. | |
| 5,923,782 A | 7/1999 | Chhabra et al. | |
| 5,974,197 A | 10/1999 | Lee et al. | |
| 6,075,918 A | 6/2000 | Strongin et al. | |
| 6,240,492 B1 * | 5/2001 | Foster et al. | 711/149 |
| 6,259,734 B1 | 7/2001 | Boon | |
| 6,314,209 B1 | 11/2001 | Kweon et al. | |
| 6,348,925 B1 | 2/2002 | Potu | |
| 6,360,024 B1 | 3/2002 | Tan et al. | |
| 6,441,754 B1 | 8/2002 | Wang et al. | |
| 6,614,930 B1 | 9/2003 | Agnihotri et al. | |
| 6,859,558 B2 | 2/2005 | Hong | |
| 6,859,561 B2 | 2/2005 | Mitchell et al. | |
| 7,006,112 B2 | 2/2006 | Chia et al. | |

(Continued)

FOREIGN PATENT DOCUMENTS

EP  1 351 513  10/2003

OTHER PUBLICATIONS

Official Communication for Chinese Patent Application No. 200680002803.4, dated Jan. 8, 2010.

(Continued)

*Primary Examiner* — Behrooz Senfi
(74) *Attorney, Agent, or Firm* — Hamilton & Terrile, LLP; Michael Rocco Cannatti

(57) ABSTRACT

A video processing apparatus and methodology use a combination of a processor and a video decoding hardware block to decode video data by using a reference block cache memory to perform motion compensation decode operations in the video decoding hardware block. To improve the cache hit rate, each memory access for required reference block(s) is used to fetch one or more additional reference blocks which can be used to improve the cache hit rate with future motion compensation operations. Speculative fetch control logic selects the additional reference blocks by using a frequency history table to accumulate compared motion vector information for a current motion compensation block with motion vector information from previously processed motion compensation blocks.

19 Claims, 6 Drawing Sheets

U.S. PATENT DOCUMENTS

| | | | |
|---|---|---|---|
| 7,162,093 | B2 | 1/2007 | Regunathan et al. |
| 2001/0005432 | A1* | 6/2001 | Takahashi et al. ............ 382/243 |
| 2002/0071599 | A1 | 6/2002 | Herget et al. |
| 2003/0138150 | A1 | 7/2003 | Srinivasan |
| 2003/0158987 | A1 | 8/2003 | MacInnis et al. |
| 2003/0206664 | A1 | 11/2003 | Gomila et al. |
| 2004/0062307 | A1 | 4/2004 | Hallapuro et al. |
| 2004/0213345 | A1 | 10/2004 | Holcomb et al. |
| 2004/0213468 | A1* | 10/2004 | Lee et al. ...................... 382/236 |
| 2004/0218671 | A1 | 11/2004 | Haraguchi et al. |
| 2005/0013494 | A1 | 1/2005 | Srinivasan et al. |
| 2005/0031216 | A1 | 2/2005 | Kondo et al. |
| 2005/0047666 | A1 | 3/2005 | Mitchell et al. |
| 2005/0168470 | A1* | 8/2005 | Prabhakar et al. ............ 345/531 |
| 2005/0259688 | A1 | 11/2005 | Gordon |
| 2005/0259887 | A1 | 11/2005 | Hellman |
| 2005/0281339 | A1 | 12/2005 | Song |
| 2006/0050976 | A1* | 3/2006 | Molloy ......................... 382/233 |
| 2006/0165181 | A1 | 7/2006 | Kwan et al. |
| 2006/0193383 | A1* | 8/2006 | Alvarez et al. ........... 375/240.03 |

OTHER PUBLICATIONS

International Search Report and Written Opinion of the International Searching Authority, PCT/US2006/001599, mailed May 31, 2006.

Bin Sheng et al., "A platform-based architecture of loop filter for AVS," Signal Processing 2004, Proceedings, ICSP 'Apr. 2004 7th International Conference on Beijing, China Aug. 31-Sep. 4, 2004, Piscataway NJ, IEEE, Aug. 31, 2004, pp. 571-574.

Bin Sheng et al., "An implemented architecture of deblocking filter for H.264/AVC," Image Processing, 2004, ICIP '04, 2004 International Conference on Singapore , Oct. 24-27, 2004, Piscataway, NJ, IEEE vol. 1, Oct. 24, 2004, 665-668.

Lee Y-L et al., "Loop filtering and post-filtering for low-bit-rates moving picture coding," Signal Processing, Image Communication, Elsevier Science Publishers, Amsterdam, NL, vol. 16, No. 9, Jun. 2001, pp. 871-890.

Srinivasan S. et al., "Windows Media Video 9: Overview and applications," Signal Processing, Image Communication, Elsevier Science Publishers, Amsterdam, NL, vol. 19, No. 9, Oct. 2004, pp. 851-875.

V. Venkatraman et al., "Architecture for De-Blocking Filter in H.264," Picture Coding Symposium (PCS) San Francisco, 2004, 5 pages.

X. Sun et al., "In-Loop Deblocking Filter for Block-Based Video Coding," International Conference on Signal Processing, vol. 1, pp. 33-36 (2002) http://research.microsoft.com/asia/dload_files/group/imedia/2002p/deblocking_icsp_02.pdf, 4 pages.

Translation of Official Communication for German Application No. 11 2006 000 270.8-55, dated Apr. 29, 2009.

International Search Report and Written Opinion of the International Searching Authority, PCT/US2006/001598, mailed May 31, 2006.

Official Communication for German Patent Application No. 11 2006 000 271.6, dated May 8, 2009.

* cited by examiner

MACROBLOCK CACHE

BACKGROUND OF THE INVENTION

1. Field of the Invention

The present invention relates to video processing technology. In one aspect, the present invention relates to decompression of digital video information.

2. Description of the Related Art

Because video information requires a large amount of storage space, video information is generally compressed. Accordingly, to display compressed video information which is stored, for example on a CD-ROM or DVD, the compressed video information must be decompressed to provide decompressed video information. The decompressed video information is then provided in a bit stream to a display. The decompressed bit stream of video information is typically stored as a bit map in memory locations corresponding to pixel locations on a display. The video information required to present a single screen of information on a display is called a frame. A goal of many video systems is to quickly and efficiently decode compressed video information so as to provide motion video by displaying a sequence of frames.

Standardization of recording media, devices and various aspects of data handling, such as video compression, is highly desirable for continued growth of this technology and its applications. A number of (de)compression standards have been developed or are under development for compressing and decompressing video information, such as the Moving Pictures Expert Group (MPEG) standards for video encoding and decoding (e.g., MPEG-1, MPEG-2, MPEG-3, MPEG-4, MPEG-7, MPEG-21) or the Windows Media Video compression standards (e.g., WMV9). Each of the MPEG and WMV standards are hereby incorporated by reference in its entirety as if fully set forth herein.

In general, video compression techniques include intraframe compression and interframe compression which operate to compress video information by reducing both spatial and temporal redundancy that is present in video frames. Intraframe compression techniques use only information contained within the frame to compress the frame, which is called an I-frame. Interframe compression techniques compress frames with reference to preceding and/or following frames, and are typically called predicted frames, P-frames, or B-frames. Intraframe and interframe compression techniques usually use a spatial or block-based encoding whereby a video frame is split into blocks for encoding (also referred to as a block transformation process). For example, an I-frame is split into 8×8 blocks. The blocks are coded using a discrete cosine transform (DCT) coding scheme which encodes coefficients as an amplitude of a specific cosine basis function, or some other transform (e.g., integer transform). The transformed coefficients are then quantized, which produces coefficients with non-zero amplitude levels and runs (or subsequences) of zero amplitude level coefficients. The quantized coefficients are then run-level encoded (or run length encoded) to condense the long runs of zero coefficients. The results are then entropy coded in a variable length coder (VLC) which uses a statistical coding technique that assigns codewords to values to be encoded, or using some other entropy encoding techniques, such as a Context-based Adaptive Binary Arithmetic Coding (CABAC), Context Adaptive Variable Length Coding (CAVLC) and the like. Values having a high frequency of occurrence are assigned short codewords, and those having infrequent occurrence are assigned long codewords. On the average, the more frequent shorter codewords dominate so that the code string is shorter than the original data. Thus, spatial or block-based encoding techniques compress the digital information associated with a single frame. To compress the digital information associated with a sequence of frames, video compression techniques use the P-frames and/or B-frames to exploit the fact that there is temporal correlation between successive frames. Interframe compression techniques will identify the difference between different frames and then spatially encode the difference information using DCT, quantization, run length and entropy encoding techniques, though different implementations can use different block configurations. For example, a P-frame is split into 16×16 macroblocks (e.g., with four 8×8 luminance blocks and two 8×8 chrominance blocks) and the macroblocks are compressed. Another approach is to use motion compensation techniques to approximate the motion of the whole scene or objects in the scene and/or blocks in the video frame using parameters (e.g., motion vectors) encoded in the bit-stream to approximate the pixels of the predicted frame by appropriately translating pixels of the reference frame. Regardless of whether intraframe or interframe compression techniques are used, the use of spatial or block-based encoding techniques to encode the video data means that the compressed video data has been variable length encoded and otherwise compressed using the block-based compression techniques described above.

At the receiver or playback device, the compression steps are reversed to decode the video data that has been processed with block transformations. FIG. 1 depicts a conventional system 30 for decompressing video information which includes an input stream decoding portion 35, motion decoder 38, adder 39, frame buffer 40, and display 41. Input stream decoder 35 receives a stream of compressed video information at the input buffer 31, performs variable length decoding at the VLC decoder 32, reverses the zig-zag and quantization at the inverse quantizer 33, reverses the DCT transformation at IDCT 34 and provides blocks of staticly decompressed video information to adder 39. In the motion decoding portion 38, the motion compensation unit 37 receives motion information from the VLC decoder 32 and a copy of the previous picture data (which is stored in the previous picture store buffer 36), and provides motion-compensated pixels to adder 39. Adder 39 receives the staticly decompressed video information and the motion-compensated pixels and provides decompressed pixels to frame buffer 40, which then provides the information to display 41.

Conventional approaches for handling video decompression have used a processor-based approach for executing software instruction to perform that various video decompression steps. However, the computationally intensive video decompression operations (such as the averaging and interpolation steps involved with motion compensation) require extensive processor resources, and can severely burden the system processor when implemented in a general purpose computer system. Such processor-based systems that are not able to keep up with the computational demands of such a decompression burden frequently drop entire frames to resynchronize with a real time clock signal also encoded in the video stream. While a variety of factors contribute to the challenge of obtaining timely video decompression, a significant contributing factor is the overhead associated with generating and retrieving pre-decoded reference frames in connection with motion compensation processes used with video decompression techniques (such as MPEG, WMV or H.263). With conventional processor-based approaches for handling video decompression, the motion compensation portion of the decoding process requires access to the reference frame data. The reference frame requirements can be readily accessed when there is a large memory buffer to hold a frame (e.g. VGA size of 640×480 pixels, equivalent to 307 kBytes).

On the other hand, hardware-based approaches for performing motion compensation processing require a large local memory and pose significant bus bandwidth requirements, often resulting in slower memory access speed. In particular, hardware designs typically can not retrieve the whole previous decoded frame, but instead are implemented with a processor core that fetches only whatever is needed for the current macroblock due to limitations imposed by the on-chip memory size. The resulting bus transaction activity can slow the decoding process. In addition, with typical System-on-a-chip (SoC) bus protocols, memory access bandwidth is wasted with the protocol requirements that memory accesses align to the bus width boundary and use predetermined data transfer sizes. For example, if 9 bytes of reference row data located in memory at starting address 18 are to be accessed over a bus having a bus width of 8 bytes where only 1, 2 or 4 beats of burst transfer are allowed (meaning that 8, 16 or 32 bytes of memory access are allowed), then the memory access would use two burst beats beginning at address signal 16, resulting in a bandwidth waste of approximately 43%.

Consequently, a significant need exists for reducing the processing requirements associated with decompression methods and for improving the decompression operations. Further limitations and disadvantages of conventional systems will become apparent to one of skill in the art after reviewing the remainder of the present application with reference to the drawings and detailed description which follow.

SUMMARY OF THE INVENTION

By using a combination of software and hardware to perform video decompression, a flexible decompression system is provided that can be adapted to quickly and efficiently process a variety of different video compression schemes. The flexible decompression system includes a processor for performing front end decompression steps, and a video accelerator circuit for performing back end decompression steps, including performing motion compensation using a cache memory for storing reference blocks for possible re-use. To reduce the memory bandwidth requirements as reference blocks are fetched during motion compensation decoding, a reference block cache is provided in the decompression hardware unit for preventing the need to re-fetch recently used data. In addition, a speculative fetch can be used with the macroblock cache to fetch reference blocks that may also be used as bandwidth permits.

In accordance with one or more embodiments of the present invention, a video processing system, apparatus and methodology are provided for performing motion compensation decoding of video data by caching at least a first required reference block in a video decode circuit. For example, when a first current block is decoded to identify a required reference block and a motion vector, the required reference block may be fetched from cache memory instead of from main memory if it is determined that the required reference block is stored in the cache memory. If the required reference block is not stored in the cache memory, then the required reference block and at least a second reference block may be fetched from main memory and stored in the cache memory. In this embodiment, the cache memory is sized to store a required reference block row and at least one additional reference block row which is adjacent to the required reference block row. The second reference block may be identified or selected in a variety of ways, including using speculative fetch techniques, using a frequency history table, using random selection techniques, using the directional tendency of how previously selected reference blocks are being fetched, or some combination of the foregoing. In a selected embodiment, the second reference block is selected by using a frequency history table to track a motion vector tendency with previously decoded motion compensation blocks.

The objects, advantages and other novel features of the present invention will be apparent to those skilled in the art from the following detailed description when read in conjunction with the appended claims and accompanying drawings.

DETAILED DESCRIPTION

While illustrative embodiments of the present invention are described below, it will be appreciated that the present invention may be practiced without the specified details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring the present invention. Such descriptions and representations are used by those skilled in the art to describe and convey the substance of their work to others skilled in the art. The present invention will now be described with reference to the drawings described below.

Figure 1:
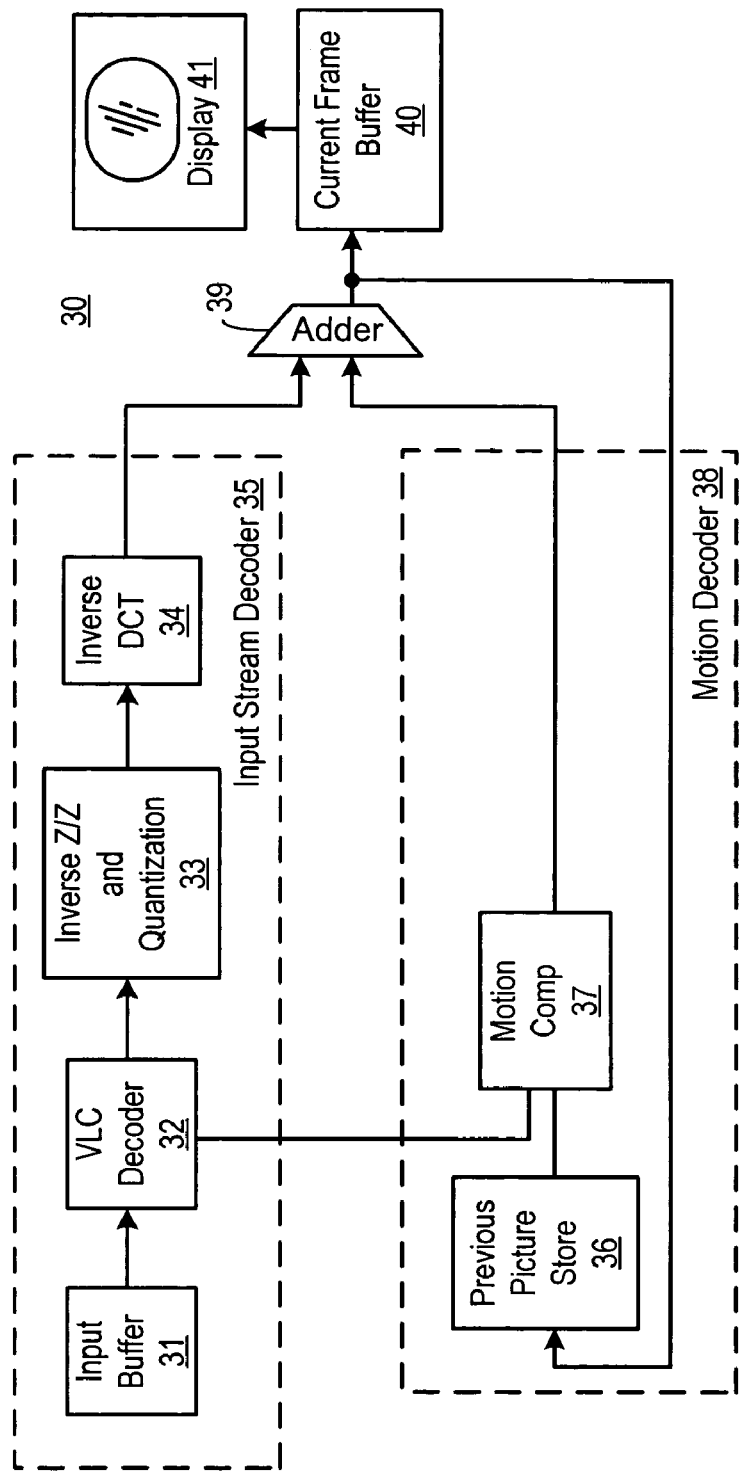
FIG. 1 shows a block diagram representation of a system for decompressing video information.
Figure 2:
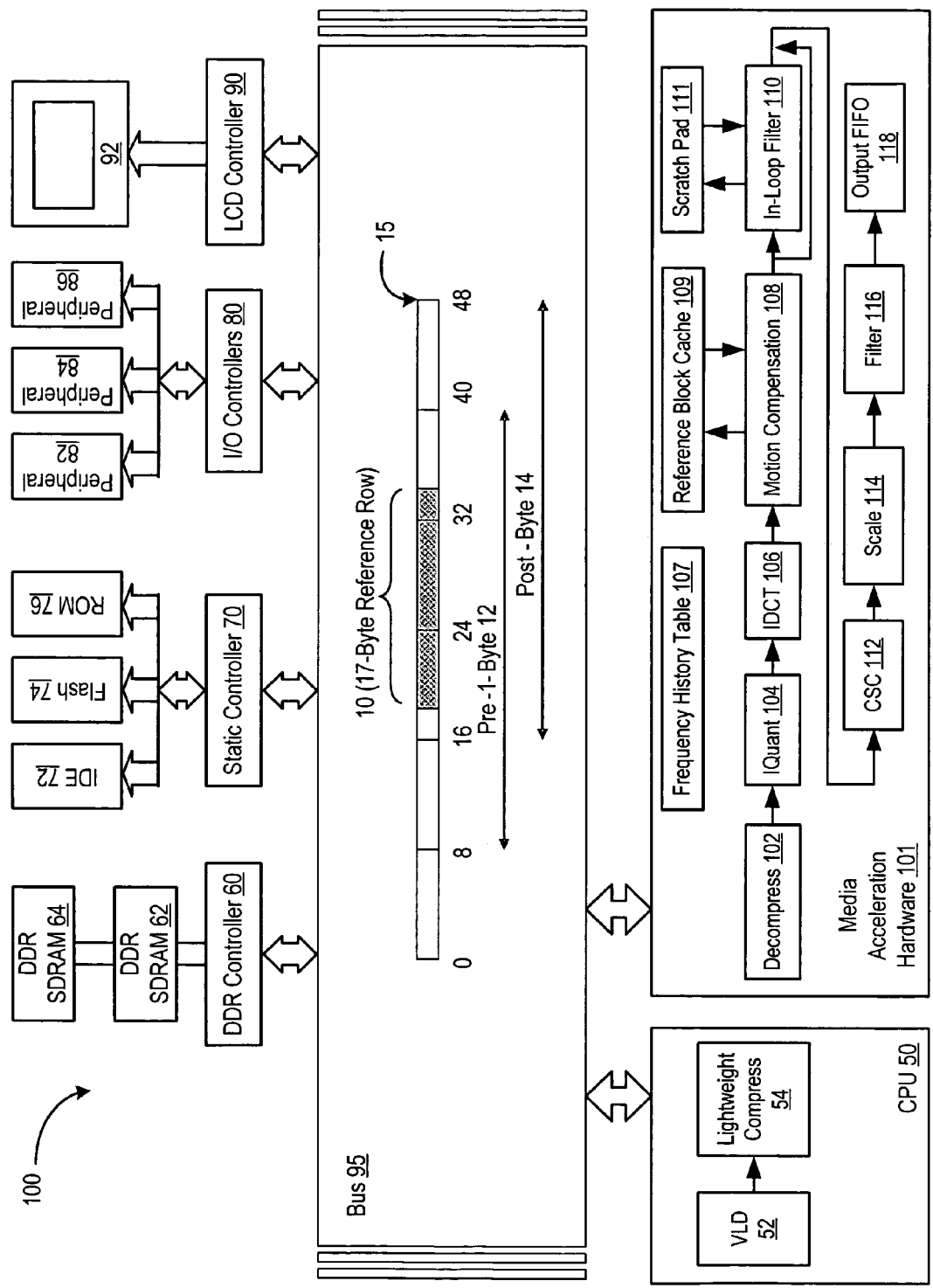
FIG. 2 shows a block diagram representation of an exemplary video decompression system constructed in accordance with the present invention.

Referring to FIG. 2, a block diagram representation of an exemplary video decompression system 100 in accordance with the present invention is provided. As depicted, the video decompression system 100 may implemented in any video playback device, such as desktop or laptop computer, wireless or mobile device, personal digital assistants, mobile or cellular phones, and any other video playback device that includes video imaging features. As depicted in FIG. 2, the video decompression system 100 is implemented as a host or applications processing unit that includes a bus 95 coupled to one or more processors or processing units 50 and a video or media acceleration hardware unit 101. In addition, the video decompression system 100 includes a main memory system that includes a large DDR SDRAM 62, 64 that is accessed through a DDR controller 60. In addition or in the alternative, one or more memories (e.g., IDE 72, flash memory unit 74, ROM 76, etc.) are accessed through the static memory controller 70. Either or both of the DDR SDRAM or other memories may be integrated with or external to the video decompression system 100. Of course, other peripheral and display devices (82, 84, 86, 92) may be accessed through the respective controllers 80, 90. For clarity and ease of understanding, not all of the elements making up the video decompression system 100 are described in detail. Such details are well known to those of ordinary skill in the art, and may vary based on the particular computer vendor and microprocessor type. Moreover, the video decompression system 100 may include other buses, devices, and/or subsystems, depending on the implementation desired. For example, the video decompression system 100 may include caches, modems, parallel or serial interfaces, SCSI interfaces, network interface cards, and the like. In the illustrated embodiment, the CPU 50 executes software stored in the flash memory 74 and/or SDRAM 62, 64.

In the video decompression system 100 depicted in FIG. 2, the CPU 50 performs the initial variable length decoding function, as indicated at the VLD block 52, while the media acceleration hardware unit 101 performs the inverse quantization 104, inverse transform 106, motion compensation 108, in-loop filtering 110, color space conversion 112, scaling 114 and filtering 116 on the decode data. The resulting decoded data may be temporarily stored in an output buffer 118 and/or frame buffer (not shown) before being displayed on the display 92. By dividing the decode processing functions between the processor 50 and media acceleration hardware 101, the front end decoding steps (e.g., variable length decoding) can be implemented in software to accommodate a variety of different compression schemes (e.g., MPEG-1, MPEG-2, MPEG-3, MPEG-4, MPEG-7, MPEG-21, WMV9, etc.). The decode data generated by the front end is provided to the media acceleration hardware 101 which further decodes the decode data to provide pixel values to output buffer 118 or frame buffer on a macroblock by macroblock basis until a frame is completed.

In operation, the video decompression system 100 receives a compressed video signal from a video signal source such as a CD ROM, DVD or other storage device. The compressed video signal is provided as a stream of compressed video information to the processor 50 which executes instructions to decode the variable length coded portion of the compressed signal to provide a variable length decoded data (VLD data) signal. Once the software assist is employed to perform variable length decoding, the VLD data (which includes headers, matrix weights, motion vectors, transformed residue coefficients and even differential motion vectors) is conveyed to the media acceleration hardware unit 101, either directly or using the data compression techniques described more fully in U.S. patent application Ser. No. 11/042,365, filed Jan. 25, 2005 (entitled "Lightweight Compression Of Input Data"). At the media acceleration hardware unit 101, once the VLD data is received, the data is provided to the inverse zig-zag and quantizer circuit 104 which decodes the VLD data signal to provide a zig-zag decoded signal. The inverse zig-zag and quantization compensates for the fact that, while a compressed video signal is compressed in a zig-zag run-length code fashion, the zig-zag decoded signal is provided to inverse DCT circuit 106 as sequential blocks of information. Accordingly, this zig-zag decoded signal provides blocks which are in the order required for raster scanning across display 92. This zig-zag decoded signal is then provided to inverse transform circuit 106 (e.g., IDCT or inverse integer transform) which performs an inverse discrete cosine transform on the zig-zag decoded video signal on a block by block basis to provide staticly decompressed pixel values or decompressed error terms. The staticly decompressed pixel values are processed on a block-by-block basis through the motion compensation unit 108 which provides intraframe, predicted, and bidirectional motion compensation, including support for one, two and four motion vectors (16×16, 16×8 and 8×8 blocks). When reference blocks are fetched during motion compensation, a reference block cache 109 is used to hold retrieved reference blocks, along with adjacent blocks, for possible re-use during subsequent motion compensation operations. The in-loop filter 110 performs overlap smoothing and/or deblocking to reduce or eliminate blocking artifacts in accordance with the WMV9 compression standard by using the scratch pad memory 111 to store partially finished macroblock filter data, more fully in U.S. patent application Ser. No. 11/042,218, filed Jan. 25, 2005, entitled "Scratch Pad for Storing Intermediate Loop Filter Data." The color space converter 112 converts one or more input data formats (e.g., YCbCr 4:2:0) into one or more output formats (e.g., RGB), and the result is filtered and/or scaled at filter 116.

As disclosed herein, when fetching reference blocks during motion compensation, successive reference blocks often overlap. The macroblock cache 109 reduces the need to re-fetch data already used by keeping previous data. In addition, where unaligned or non-optimal loads from memory are used for motion compensation, the reference block cache 109 may be used, alone or in combination with speculative fetch techniques, to fetch reference blocks that are likely to be used, to the extent bandwidth allows. This approach exploits the fact that, from macroblock to macroblock, some of the same data would be used for motion compensation. By adding a small block of memory, the previous macroblock's data may be cached for use with the next macroblock, decreasing system bandwidth and increasing the efficiency of DDR accesses.

Figure 3:
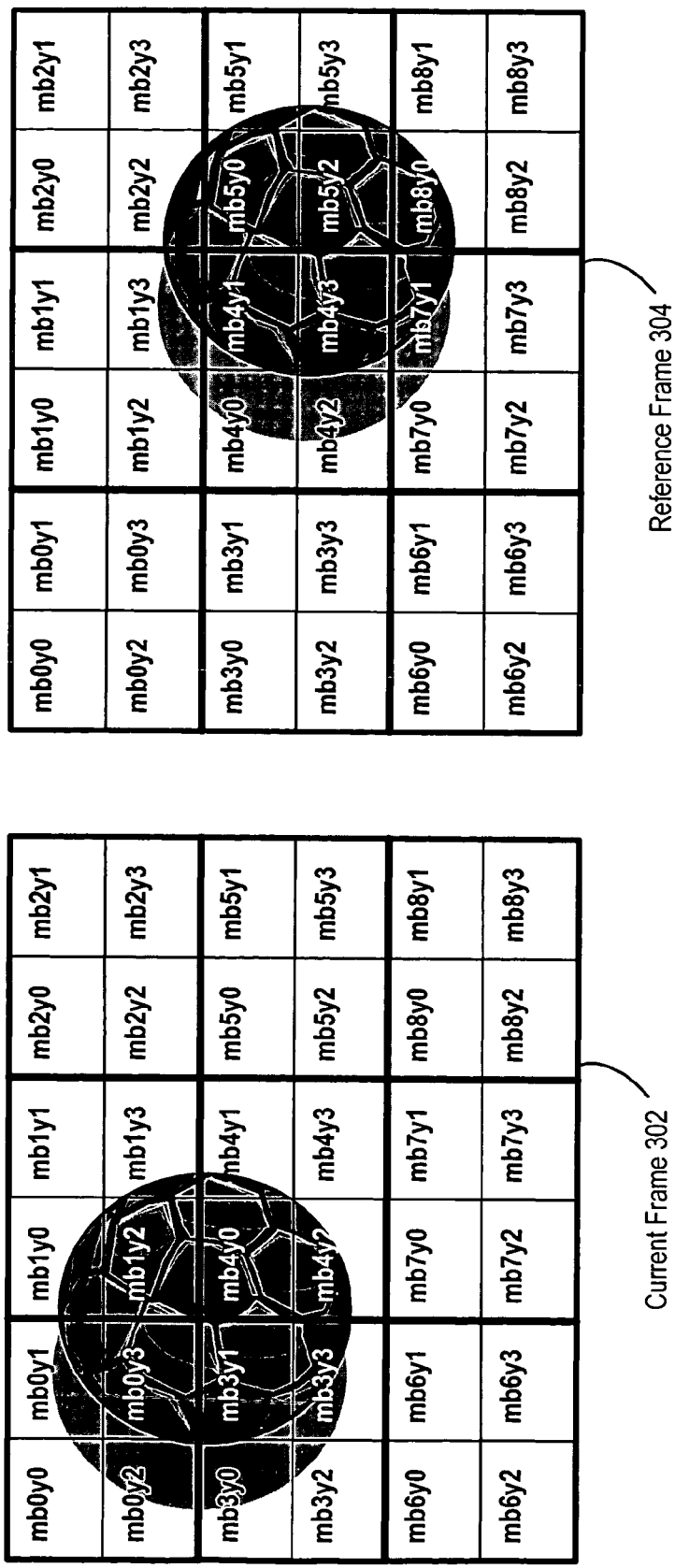
FIG. 3 depicts a current frame and a reference frame, each of which is divided into a plurality of macroblocks and blocks in order to illustrate a selected embodiment of the present invention.

FIG. 3 depicts a current frame 302 and a reference frame 304, where each frame is constructed with multiple macroblocks (e.g., macroblocks 0-8), where each macroblock (e.g., macroblock 0 or mb0) is constructed as a block of 16×16 pixels that are divided into a plurality of blocks (e.g., blocks y0, y1, y2 and y3), each of which is constructed as a block of 8×8 pixels. To illustrate an example of present invention, the current frame 302 depicts an image of a soccer ball in a first position on the frame (e.g., in macroblocks mb0, mb1, mb3 and mb4), while the reference frame 304 depicts an image of the soccer ball in a second position on the frame (e.g., in macroblocks mb1, mb2, mb4, mb5, mb7 and mb8). In the motion compensation process, a selected block in the current frame 302 (e.g., mb0$y$0) includes motion vector information identifying a block from the reference frame 304 (e.g., mb1$y$2) that can be used to assemble the current frame, thereby eliminating the requirement of coding and transferring the data in the selected block. In similar fashion, the motion vector information for current blocks mb0$y$1, mb1$y$0, mb0$y$2, mb0$y$3, mb1$y$2, mb1$y$3, mb3$y$0, mb3$y$1, mb4$y$0, mb4$y$1, mb3$y$2, mb3$y$3 and mb4$y$2 would identify, respectively, mb1$y$3, mb2$y$2, mb4$y$0, mb4$y$1, mb5$y$0, mb5$y$1, mb4$y$2, mb4$y$3, mb5$y$2, mb5$y$3, mb7$y$0, mb7$y$1 and mb8$y$0.

In addition to fetching the reference block identified by the motion vector for a selected current block, additional pixels adjacent to the reference block should also be retrieved from the reference frame 304 for pixel interpolation. Thus, if the current motion compensation block is 8×8, then a block of 10×10 pixels is fetched to provide two pixels around the perimeter of the reference block. With the example of FIG. 3, if motion vector information for mb0$y$1 identifies reference block mb1$y$3, then mb1$y$3 and at least two more pixels of the adjacent reference blocks mb1y2 and mb2y2 should be fetched from memory and returned as the fetched blocks in order to provide the 10×10 reference block.

To expedite motion compensation processing, a cache memory 109 is provided for temporarily storing fetched reference blocks for subsequent reuse. While there is relatively small probability of re-referencing the same pixels (e.g., less than 20%), a reference block cache that is sized to store only the fetched reference blocks nonetheless may enhance the performance of the video decompression operations by reducing the number of bus transactions. However, additional bandwidth savings can be obtained by increasing the size of the reference block cache 109 to exploit the spatial data locality in image data. The provision of a larger reference block cache 109 also allows the media acceleration hardware 101 to conform with SoC bus protocols requiring memory accesses to align to a bus boundary width, insofar as the larger cache 109 can hold the full bus width of fetched data.

This may be illustrated with the example depicted in FIG. 2, where a 17-byte reference row 10 is stored at bytes 18-34 in a line 15 of the DDR SRAM 64. If the bus 95 has an 8-byte bus width where only 1, 2 or 4 beats of burst are allowed, then a 32-byte burst over the bus 95 is necessary in order for the media acceleration hardware unit 101 to fetch the reference row 10. In this example, the starting address can be 8 or 16. In accordance with selected embodiments of the present invention, extra bytes may be fetched from the memory 64 for re-use in the future. For example, by prefetching and caching pixels to the right of current reference block 10 (e.g., bytes 35-48 in line 15 of the DDR SRAM 64), the hit rate in cache 109 improves significantly. In addition, appropriate sizing of the cache 109 permits prefetching of pixels above or below the current reference block.

Bandwidth may be improved even further by speculatively fetching additional reference blocks to fill the cache 109, where the additional blocks are identified by predicting the tendency of the motion vectors in the vicinity of each current block. In an illustrative embodiment, the media acceleration hardware unit 101 includes frequency history table (FHT) and selection control logic 107 which monitors and records the pattern of previous fetch accesses in a frequency history table. The details of the frequency history table and logic may implemented in any desired way to provide an indication of the relative position of the current frame (or any sub-part thereof) in relation to the reference frame (or any sub-part thereof). In a selected embodiment, the frequency history table and logic predicts the motion vectors at a localized or block-level basis by recording three categories of information in the table, including the number of pre-1-byte accesses, the number of post-byte accesses. When a new inter-block is processed, its motion vector is compared with the previous motion vectors and the results of the comparison or accumulated or stored in the reference fetch table. This comparison and recording process is repeated for each motion compensation block in the current frame 302, starting with macroblock 0 (mb0), but not including the left-most blocks on the frame boundary. As the table of motion vector pattern information is accumulated, it can be used to determine the starting address of any memory access whenever a new reference block fetch is necessary. For example, if the motion vectors for the current blocks in a region of a frame are consistently moving the fetched reference blocks to the left, this will be reflected in the frequency history table and used during memory access operations to position the starting address of a subsequent memory access to include a reference block to the right of the fetched reference blocks. The frequency history table will be reset when a new frame starts.

Figure 4A:
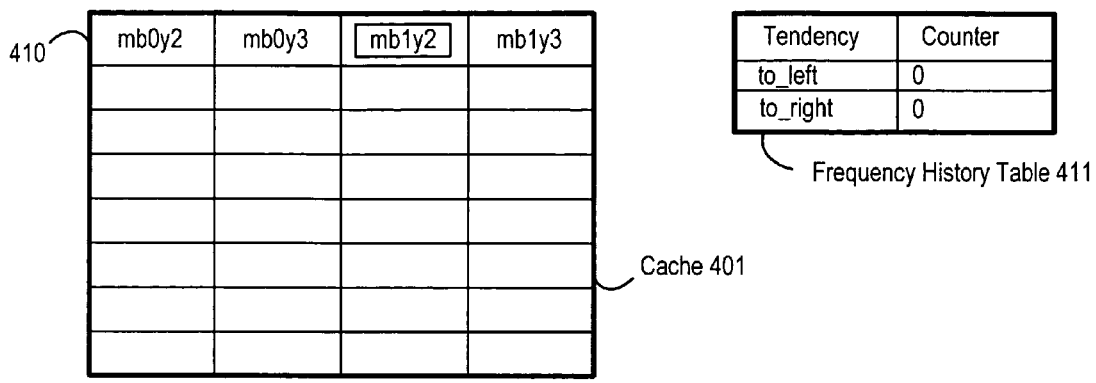
FIGS. 4(*a*)-4(*c*) depict a simplified representation of a cache memory and history table which are used to store and track reference blocks in connection with motion compensation operations.
Figure 4B:
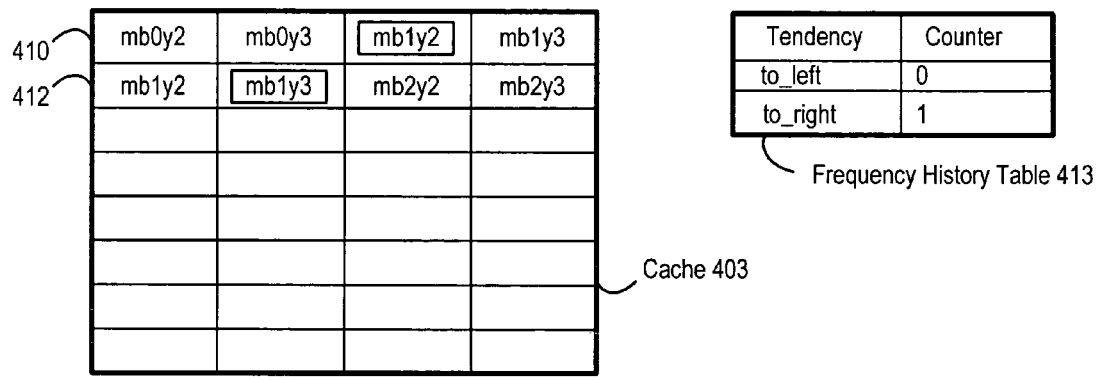
Figure 4C:
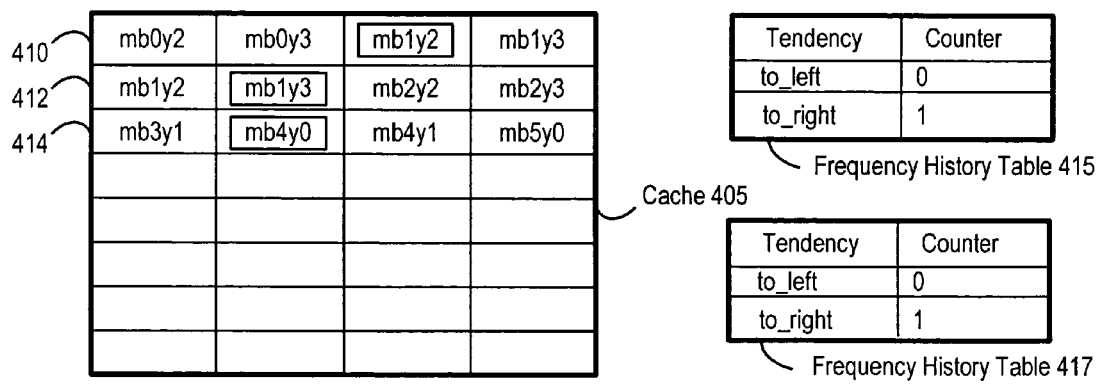

Turning now to FIGS. 4(a)-4(c), a simplified representation is depicted of a cache memory and frequency history table which are used to store and track reference blocks in connection the motion compensation example depicted in FIG. 3. In this example, the reference block cache 401 is implemented with 32-byte cache lines. In addition, no partial hits are permitted on the cache 401, so that a partial miss requires that another memory access be performed to fill a new cache line. Memory fetch operations in this example may use an effective burst size over the bus of 16 or 32 bytes, where the starting address of the burst is aligned to an 8-byte boundary. With this example configuration, a 10×10 block of reference data is fetched by performing ten read requests of 16/32 bytes, one read request for each row of the 10×10 reference block.

Beginning with the decoding of motion compensation block mb0y0 in the current frame 302, the decoded motion vector identifies the reference block mb1y2 in the reference frame 304. In addition to fetching the identified reference block mb1y2, subsequent pixel interpolation operations may also require at least one pixel from reference block mb0y3 and at least one pixel from reference block mb1y3. At this starting point of the frame processing, the reference block cache 109 is empty, so the required blocks will need to be fetched from the system memory. Because the reference block cache 109 is sized to hold at least one additional block, the memory access operation can also fetch an additional adjacent block, which in this case could be either reference blocks mb0y2 or mb2y2. In the absence of any indication from the frequency history table 411 (which has not yet been populated at this stage of the process), a random selection process determines that reference block mb0y2 (to the left of the required reference blocks) will also be fetched. The fetched data blocks mb0y2, mb0y3 (identified by the motion vector), mb1y2 and mb1y3 (randomly selected) are then stored in the first row 410 of the reference block cache 401. At the left-most blocks in the current frame 302 is being processed, there are no previous motion compensation blocks available for comparison, so there is no comparison data that can be used to update the frequency history table 411. At this point, the contents of the cache 401 and frequency history table 411 are depicted in FIG. 4(a).

At the next motion compensation block mb0y1 in the current frame 302, the decoded motion vector identifies the reference block mb1y3 in the reference frame 304. In addition to fetching the identified reference block mb1y3, reference blocks mb1y2 and mb2y2 are also needed for pixel interpolation. As indicated in FIG. 4(a), the required reference blocks mb1y2, mb1y3 and mb2y2 are not fully in the cache 401 (cache miss), which means that a memory fetch operation is required. Again, the size of the cache allows an additional block to be fetched—either mb0y3 or mb2y3. Since the frequency history table 411 provides no prediction information, a random selection process determines that reference block mb2y3 (to the right of the required reference blocks) will also be fetched. The fetched data blocks mb1y2, mb1y3 (identified by the motion vector), mb2y2 and mb2y3 (randomly selected) are then stored in the second row 412 of the reference block cache 403. The frequency history table 413 is then updated by comparing the motion vector for motion compensation block mb0y1 against the current motion compensation block mb0y0. In particular, since the reference block of mb0y1 (reference block mb1y3) is to the right of the reference block of mb0y0 (reference block mb1y2), the frequency history table 413 is updated by incrementing the "to_right" value by 1. At this point, the contents of the cache 403 and frequency history table 413 are depicted in FIG. 4(b).

At the next motion compensation block mb0y2 in the current frame 302, the decoded motion vector identifies the reference block mb4y0 in the reference frame 304. In addition to fetching the identified reference block mb4y0, reference blocks mb3y1 and mb4y1 are also needed for pixel interpolation. As indicated in FIG. 4(b), the required reference blocks mb3y1, mb4y0 and mb4y1 are not in the cache 403 (cache miss), which means that a memory fetch operation is required. Because the size of the cache allows an additional block to be fetched, either reference blocks mb3y0 or mb5y0 may be fetched. Since the frequency history table 413 indicates that "to_right" wins, reference block mb5y0 will be fetched since it is to the right of the required reference blocks. The fetched data blocks mb3y1, mb4y0 (identified by the motion vector), mb4y1 and mb5y0 (selected in response to the frequency history table) are then stored in the third row 414 of the reference block cache 405. Because the current motion compensation block mb0y2 is the left-most block in the current frame 302, the frequency history table 415 is not updated. At this point, the contents of the cache 405 and frequency history table 415 are depicted in FIG. 4(c).

The final motion compensation block mb0y3 in macroblock 0 of the current frame 302 includes a motion vector identifying the reference block mb4y1 in the reference frame 304. In addition to fetching the identified reference block mb4y1, reference blocks mb4y0 and mb5y0 are also needed for pixel interpolation. As indicated in FIG. 4(c), the required reference blocks mb4y0, mb4y1 and mb5y0 are in the cache 405 at line 414 so that there is a cache hit and no memory access is required. Because the reference block of mb0y3 (reference block mb4y1) is to the right of the reference block of mb0y2 (reference block mb4y0), the frequency history table 417 is updated by incrementing the "to_right" value by 1. At this point, the contents of the cache 405 and frequency history table 417 are depicted in FIG. 4(c).

In the example described with reference to FIGS. 4(a)-(c), it will be appreciated that the bandwidth saving would have been improved further if the initial random selection of the extra reference block mb0y2 (in line 410) had instead randomly selected mb2y2, which would have resulted in a cache hit when the reference blocks for motion compensation block mb0y1 were required. While random selection techniques are described herein for identifying which additional reference block to retrieve when there is no indication from the frequency history table, other selection techniques may also be used to identify which additional reference blocks are fetched.

Figure 5:
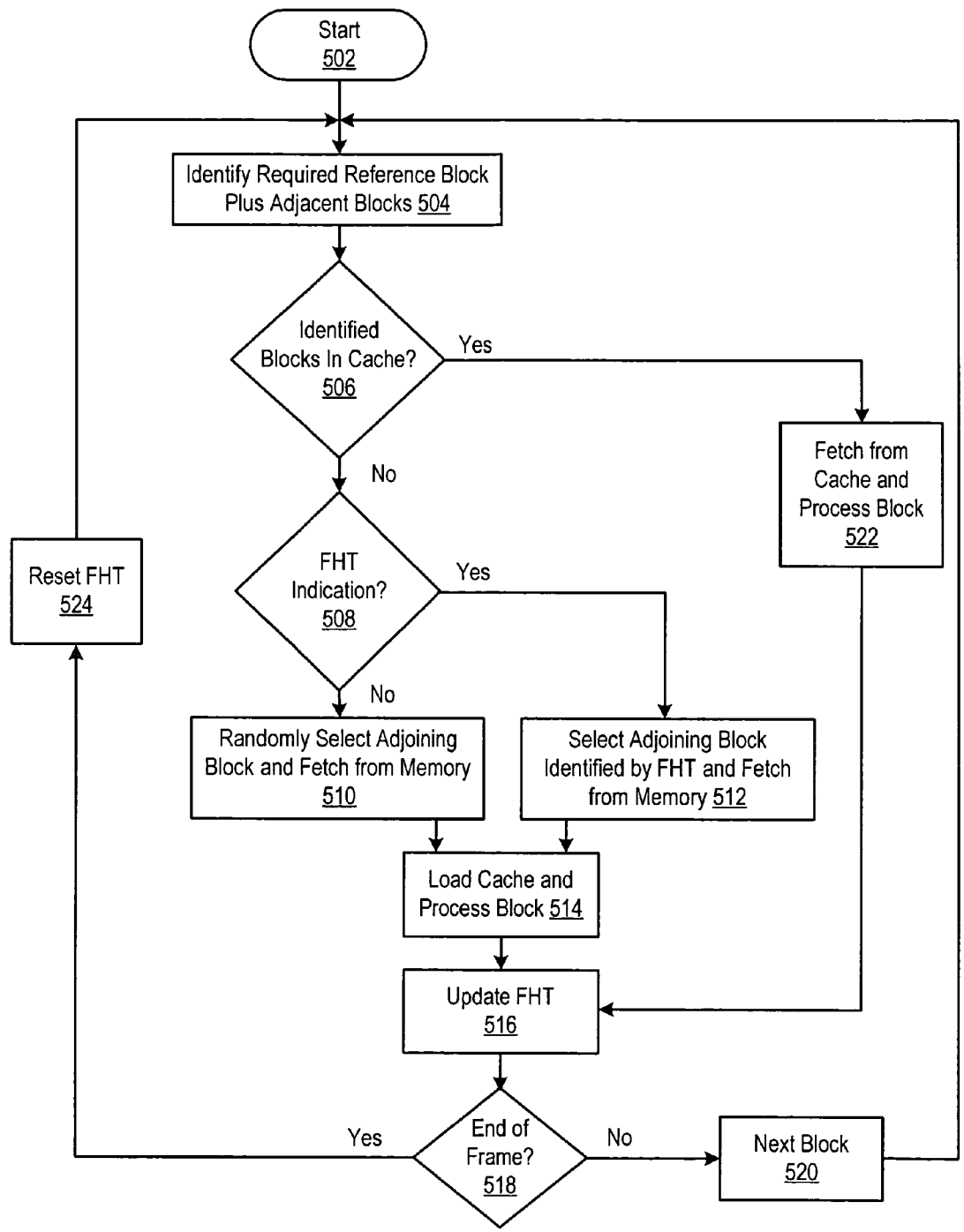
FIG. 5 depicts an example technique for caching reference block data during motion compensation operations in a video encoder or decoder.

Additional details of an alternative embodiment of the present invention are illustrated in FIG. 5 which shows an example technique for caching reference block data during motion compensation operations in a video encoder or decoder. As will be appreciated, the depicted technique may be used to process motion compensation blocks, though there may be special corner cases at the periphery of each frame where those skilled in the art will adjust and apply the present invention as required. However, for the sake of simplicity, the present disclosure focuses primarily on the reference block fetch and cache steps that are performed on the interior macroblocks of each frame by using a cache as a temporary storage for re-use of reference pixels.

With reference to FIG. 4, once the video encoder/decoder starts the motion compensation process by generating at least the first macroblock for the frame (502). As a selected motion compensation block in the current frame is processed to retrieve its motion vector information, the corresponding required reference block, along with the adjacent required reference blocks, are identified (504). When it is determined that the required reference blocks are not stored in the cache (negative outcome to decision 506), then a memory access is performed so that the required reference blocks are fetched along with additional block data. The reason for retrieving additional block data when a smaller fetch would suffice is that small overhead in additional bus cycles needed to fetch additional block data increases the opportunity for a cache hit to occur with a subsequent reference block request. As described more fully below, the additional block data may be selected using a combination of random selection techniques and/or the prior motion vector patterns to predict what the future motion vector(s) will be. Thus, if the frequency history table (FHT) does not indicate which adjacent reference block to select (negative outcome to decision 508), then the additional reference block is randomly selected and fetched from memory (510) and loaded in the cache for final processing (514), at which time any appropriate updates to the frequency history table can be made (516). An example update algorithm is to update the frequency history table based on a comparison of the relative position of the current reference block to the previous reference block so that, for example, each y0/y2 block of macroblock n (where n is not the left-most macroblock on the boundary) is compared with the y1/y3 block on the macroblock n−1. If the comparison indicates that the current reference block is to the right of the previous reference block, then the "to_right" entry is incremented, but if the comparison indicates that the current reference block is to the left of the previous reference block, then the "to_left" entry is incremented. As the process is repeated for each motion compensation block (steps 518, 520), the table updates continue for each motion compensation block in the frame, and then the table is reset (524) when a new frame is processed (affirmative outcome to decision 518).

On the other hand, if the frequency history table (FHT) indicates which adjacent reference block to select (affirmative outcome to decision 508), then the additional reference block identified by the FHT is selected and fetched from memory (512) and loaded in the cache for final processing (514), at which time any appropriate updates to the frequency history table can be made (516). So long as the end of the frame is not reached (negative outcome to decision 518), the next block is retrieved (520) and the process is repeated. When it is determined that the identified reference blocks are located in the cache (affirmative outcome to decision 506), the required reference blocks are retrieved directly from the cache (522), thereby avoiding the memory access over the bus (510 or 512) and the cache load step (514). As indicated, the direct cache access avoids memory accesses over the bus and associated cache load operations, and once final processing on the cached reference blocks is completed, the frequency history table is updated (516) to reflect motion vector comparison information for the current motion compensation block.

Figure 6:
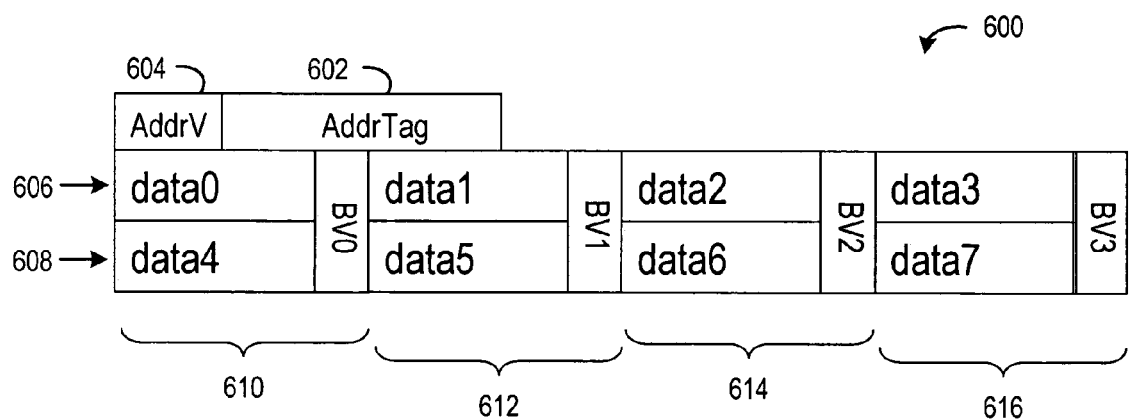
FIG. 6 depicts in simplified block diagram form a reference block cache memory for temporarily storing reference blocks for re-use of reference pixel data.

While a variety of different cache sizes, protocols and policies can be used to implement various embodiments of the present invention, a selected implementation of the present invention is depicted in FIG. 6 which depicts in simplified block diagram form a reference block cache memory 600 that is used to temporarily store reference blocks for re-use of reference pixel data. Using a cache policy that prefetches up to a 32-byte boundary whenever a cache miss or partial cache miss occurs, the fetched data is stored in 64 byte cache lines. The cache memory includes an address tag 602 (AddrTag) that is a 20-bit field which contains the block address/index, where the address tag of each cache line is aligned to the 32-byte boundary. Also included is an address valid bit 604 (AddrV) that is a 1-bit field which indicates the validness of AddrTag. Each cache line (e.g., 606 or 608) is divided into four blocks 610, 612, 614, 616. Each block (e.g., block 0 or 610) has an associated valid bit (e.g., BV0), and is constructed as 8 bytes by two rows (e.g., data0 and data4). As a result, the total cache size is 2 k bytes (32/64 cache lines*2 row-per-tag*4 data words-per-row).

With a reference block cache 600 such as depicted in FIG. 6, an attempt to fetch a 9 byte reference block at starting address 34 that is not stored in the cache will cause a 32-byte read request to be issued to the memory at starting address 32. While a shorter (e.g., 16 byte) read request to memory will be sufficient to fetch the reference block, by issuing a longer read request that requires only two additional bus cycles (where each cycle can transfer 8 bytes in a burst transfer), additional reference pixel data is retrieved and cached, thereby creating an opportunity for a cache hit with a subsequent reference block request. On the other hand, reference block requests that bridge the 32-byte alignment boundary may be split into two separate cache access operations. For example, an attempt to fetch a 9 byte reference block at starting address 28 may be split by the media acceleration hardware logic into two separate transactions, where the first transaction causes a 4-byte read request to be issued to the memory at starting address 28, and the second transaction causes a 5-byte read request to be issued to the memory at starting address 32. The two transactions can independently check the cache 600 for a hit or miss, and operate accordingly.

In addition to fetching an adjacent reference block from the same row, the present invention may also vertically prefetch reference blocks. For example, if the frame width is 176, a vertically adjacent reference block may be fetched by also issuing a 32-byte read request at starting address at (32+176). Once the vertically adjacent reference block is fetched and cached, the cache tag information is updated by setting AddrV=1, AddrTag=1 and BV[0-3]=1.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A video processing system, comprising:
a main memory for storing reference blocks;
a video accelerator adapted to perform hardwired decode functions, including motion compensation decoding operations;
a frequency history table which is updated to reflect a directional tendency of how selected reference blocks are being fetched; and
a reference block cache memory for storing reference blocks and additional pixels adjacent to each reference block that are fetched from main memory during motion compensation decoding operations for possible re-use during subsequent motion compensation and pixel interpolation decoding operations.

2. The video processing system of claim 1, where the reference blocks that are fetched from main memory and stored in the reference block cache memory comprise at least a first reference block that corresponds to a first current motion compensation block and at least a first additional reference block.

3. The video processing system of claim 2, where said at least a first reference block comprises a reference block required by the first current motion compensation block, and said at least a first additional reference block comprises a reference block that is adjacent to said first reference block.

4. The video processing system of claim 2, where said at least a first reference block comprises a reference block required by the first current motion compensation block, and said at least a first additional reference block comprises at least two reference blocks that are adjacent to said first reference block.

5. The video processing system of claim 2, further comprising speculative fetch control logic for selecting said first additional reference block.

6. The video processing system of claim 5, where the speculative fetch control logic selects said first additional reference block by comparing motion vector information for a current motion compensation block with motion vector information from previously processed motion compensation blocks.

7. The video processing system of claim 1, further comprising selection control logic for issuing a read request to main memory for at least a first reference block that corresponds to a first current motion compensation block and at least a first additional reference block that is adjacent to said first reference block.

8. The video processing system of claim 7, where the selection of the first additional reference block that is adjacent to said first reference block is based on a previous reference block access pattern.

9. The video processing system of claim 8, where the previous reference block access pattern is recorded in the frequency history table.

10. A method for fetching reference blocks during motion compensation decoding of video data, comprising:
decoding a first current block to identify at least a first required reference block and a motion vector; and
fetching the first required reference block and additional pixels adjacent to the first required reference block from a reference block cache memory upon determining that the first required reference block is stored in the reference block cache memory; and
updating a frequency history table to reflect a directional tendency of how selected reference blocks are being fetched.

11. The method of claim 10, further comprising:
fetching the first required reference block with additional pixels adjacent to the first required reference block and a second reference block with additional pixels adjacent to the second reference block from main memory for storage in the reference block cache memory if the first required reference block is not stored in the reference block cache memory.

12. The method of claim 11, where the second reference block is randomly selected from the reference blocks adjacent to the first required reference block.

13. The method of claim 11, where the second reference block is selected based on any detected directional tendency of how selected reference blocks have previously been fetched.

14. The method of claim 11, where the second reference block is selected from the reference blocks adjacent to the first required reference block by using the frequency history table.

15. The method of claim 11, where the second reference block is speculatively fetched.

16. In a video processing system for decoding video information from a compressed video data stream, an apparatus comprising:
- a processor that partially decodes the compressed video data stream to generate partially decoded video data; and
- a video decode circuit that decodes the partially decoded video data to generate video frames by performing motion compensation, said video decode circuit comprising a means for caching a first required reference block and a plurality of additional pixels adjacent to the first required reference block and a means for updating a frequency history table to reflect a directional tendency of how selected reference blocks are being fetched.

17. The apparatus of claim 16, where the video decode circuit comprises means for speculatively fetching a second reference block.

18. The apparatus of claim 17, where the means for speculatively fetching the second reference block comprises means for tracking a motion vector tendency with previously decoded motion compensation blocks.

19. The apparatus of claim 16, where the means for caching comprises a cache memory that is sized to store a required reference block row and adjacent pixels and at least one additional reference block row that is adjacent to the required reference block row.

* * * * *